(12) United States Patent
Chen

(10) Patent No.: US 11,403,152 B2
(45) Date of Patent: Aug. 2, 2022

(54) TASK ORCHESTRATION METHOD AND SYSTEM

(71) Applicant: Beijing Baidu Netcom Science and Technology Co., Ltd., Beijing (CN)

(72) Inventor: Haodong Chen, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 117 days.

(21) Appl. No.: 16/562,266

(22) Filed: Sep. 5, 2019

(65) Prior Publication Data
US 2019/0391844 A1 Dec. 26, 2019

(30) Foreign Application Priority Data
Nov. 6, 2018 (CN) .......................... 201811312691.3

(51) Int. Cl.
*G06F 9/48* (2006.01)
*G06F 9/455* (2018.01)
*G06F 9/50* (2006.01)

(52) U.S. Cl.
CPC ............ *G06F 9/5088* (2013.01); *G06F 9/455* (2013.01); *G06F 9/45533* (2013.01); *G06F 9/45558* (2013.01); *G06F 9/48* (2013.01); *G06F 9/4806* (2013.01); *G06F 9/4843* (2013.01); *G06F 9/4856* (2013.01); *G06F 9/4862* (2013.01); *G06F 9/4868* (2013.01); *G06F 9/4881* (2013.01); *G06F 9/50* (2013.01); *G06F 9/5005* (2013.01); *G06F 9/5027* (2013.01); *G06F 9/5061* (2013.01); *G06F 9/5072* (2013.01); *G06F 9/5083* (2013.01); *G06F 2009/4557* (2013.01); *G06F 2009/45562* (2013.01); *G06F 2009/45575* (2013.01); *G06F 2009/45583* (2013.01)

(58) Field of Classification Search
CPC .. G06F 9/455; G06F 9/45533; G06F 9/45558; G06F 2009/45562; G06F 2009/4557; G06F 2009/45575; G06F 2009/45583; G06F 9/50; G06F 9/5005; G06F 9/5027; G06F 9/5061; G06F 9/5072; G06F 9/48; G06F 9/4806; G06F 9/4843; G06F 9/4856; G06F 9/4862; G06F 9/4868; G06F 9/4881; G06F 9/5083; G06F 9/5088
See application file for complete search history.

(56) References Cited

U.S. PATENT DOCUMENTS

| 10,372,497 B1* | 8/2019 | Zelenov | G06F 9/5044 |
| 10,397,283 B2* | 8/2019 | Cohn | H04L 65/103 |
| 2014/0189862 A1* | 7/2014 | Kruglick | G06F 9/5027 726/22 |

(Continued)

*Primary Examiner* — Charles M Swift
(74) *Attorney, Agent, or Firm* — Kilpatrick Townsend & Stockton LLP

(57) ABSTRACT

Embodiments of the disclosure provide a method and system for task orchestration. A method may include: providing, by a task master control unit, an execution instruction of a task related to a module in an application container to a node agent service unit in an auxiliary application container bound to the application container, the auxiliary application container sharing a file system with the application container; and executing, by the node agent service unit, a command for completing the task, in response to acquiring the execution instruction of the task.

15 Claims, 7 Drawing Sheets

A task master control unit provides an execution instruction of a task to a node agent service unit — 201

The node agent service unit executes a command for completing the task, in response to acquiring the execution instruction of the task — 202

(56) References Cited

U.S. PATENT DOCUMENTS

| | | | |
|---|---|---|---|
| 2016/0210167 A1* | 7/2016 | Bolic | G06F 9/45558 |
| 2017/0003999 A1* | 1/2017 | Dalal | G06F 12/0802 |
| 2018/0246768 A1* | 8/2018 | Palermo | H04L 67/12 |
| 2018/0300176 A1* | 10/2018 | Chen | G06F 9/4887 |
| 2019/0213029 A1* | 7/2019 | Liu | G06F 15/7867 |
| 2019/0227794 A1* | 7/2019 | Mercille | G06F 9/45504 |
| 2019/0317846 A1* | 10/2019 | Li | G06F 8/60 |
| 2019/0370113 A1* | 12/2019 | Zhao | G06F 9/545 |

* cited by examiner

TASK ORCHESTRATION METHOD AND SYSTEM

CROSS-REFERENCE TO RELATED APPLICATIONS

This application claims priority to Chinese Patent Application No. 201811312691.3, filed on Nov. 6, 2018, titled "Method and system for task orchestration," which is hereby incorporated by reference in its entirety.

TECHNICAL FIELD

The present disclosure relates to the computer field, specifically to the field of cloud computing, and more specifically to a method and system for task orchestration.

BACKGROUND

In a cloud native scenario, needs for online application hosting in a cloud-based scenario are satisfied by hosting the online application on a container orchestration engine, such as Kubernetes. At present, when task orchestration is completed using the container orchestration engine, there are problems, such as failure to decouple task orchestration and resource orchestration, failure to support container program hot update, and lack of support for data delivery tasks.

SUMMARY

Embodiments of the present disclosure provide a method and system for task orchestration.

In a first aspect, an embodiment of the present disclosure provides a method for task orchestration, including: providing, by a task master control unit, an execution instruction of a task related to a module in an application container to a node agent service unit in an auxiliary application container bound to the application container, the auxiliary application container sharing a file system with the application container; and executing, by the node agent service unit, a command for completing the task, in response to acquiring the execution instruction of the task.

In a second aspect, an embodiment of the present disclosure provides a system for task orchestration, including: a task master control unit configured to: provide an execution instruction of a task related to a module in an application container to a node agent service unit in an auxiliary application container bound to the application container, the auxiliary application container sharing a file system with the application container; and the node agent service unit configured to: execute a command for completing the task, in response to acquiring the execution instruction of the task.

The method and system for task orchestration according to the embodiments of the present disclosure provide an execution instruction of a task related to a module in an application container by a task master control unit to a node agent service unit in an auxiliary application container bound to the application container, the auxiliary application container sharing a file system with the application container; and execute a command for completing the task by the node agent service unit, in response to acquiring the execution instruction of the task. Decoupling of resource management and task orchestration management is realized, files and data are organized based on a module granularity in the application container, and a hot change is completed using the node agent service unit in the auxiliary container, equivalent to providing a functionality of a container granularity data hot update failing to be provided by a cloud native container orchestration engine such as Kubernetes. Further, scheduling of tasks of a plurality of types, such as a deployment task, a timed task, a data delivery task, and a one-off command task, is unified, scheduling of an instance granularity may be carried out, and a complete fault-tolerant functionality and a high concurrent performance are provided for instance scales of medium and large-scale applications.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
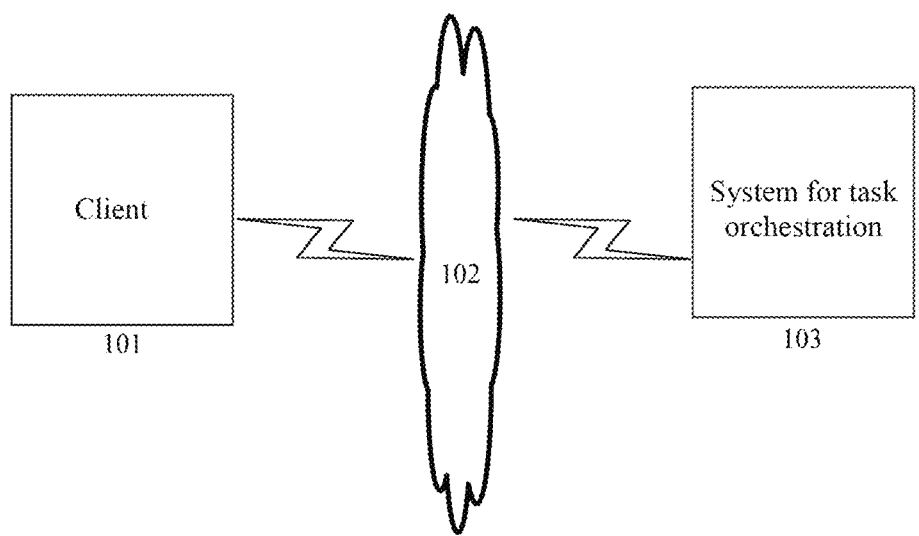
FIG. 1 shows an exemplary system architecture adapted to implement embodiments of the present disclosure.

Referring to FIG. 1, an exemplary system architecture adapted to implement embodiments of the present disclosure is shown.

As shown in FIG. 1, the system architecture includes a client 101, a network 102, and a system 103 for task orchestration. The client may be a terminal used by an operation and maintenance engineer. The system for task orchestration may be responsible for task-based orchestration and scheduling. The system for task orchestration may run in any distributed system of a Unix environment. The system for task orchestration may provide task orchestration and scheduling support of a large-scale integrated online application model in a cloud-based scenario, thereby meeting the needs, such as multi-task types, medium and large service scale (instances of a ten thousand level), hot update, and dynamic invoking, during hosting of an integrated application in a cloud native scenario. The system for task orchestration may be combined with a container orchestration engine Kubernetes, to provide an enhanced functionality of complex orchestration and scheduling for the container orchestration engine Kubernetes. The system for task orchestration may be used in combination with the Kubernetes. For example, the application is based on virtual machine hosting, and the system for task orchestration may be used in combination with public cloud IaaS systems. The system for task orchestration itself may support Kubernetes hosting. Hosting of the system for task orchestration itself supports container-based deployment in Kubernetes. The container-based deployment may be employed in units of the system for task orchestration. The units of the system for task orchestration may all be delivered by mirror images, the resource types, such as service, and StatefulSets, may be predefined, and one-click deployment may be accomplished by a resource scheduling functionality of Kubernetes.

Figure 2:
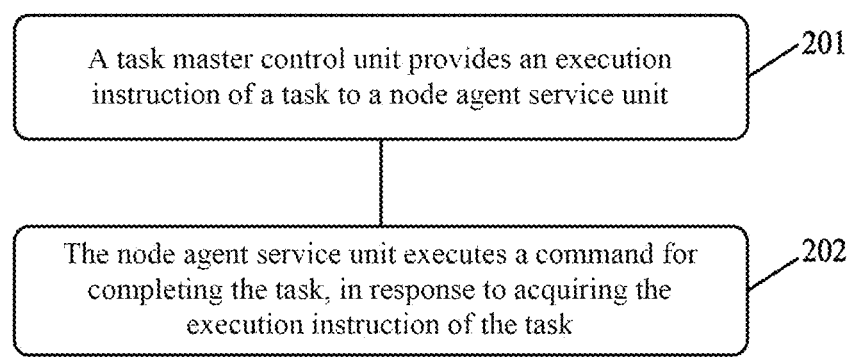
FIG. 2 shows a flowchart of a method for task orchestration according to an embodiment of the present disclosure.

Referring to FIG. 2, a process of a method for task orchestration according to an embodiment of the present disclosure is shown. The method includes the following steps.

Step 201: a task master control unit provides an execution instruction of a task to a node agent service unit.

In the present embodiment, a system for task orchestration includes units related to task orchestration, such as the task master control unit, and the node agent service unit. During task orchestration, the task master control unit may be configured to receive a request related to task orchestration sent by a client, the request related to task orchestration including: an identifier of a task related to a module in an application container; provide the execution instruction of the task to the node agent service unit in an auxiliary application container bound to the application container. The auxiliary application container shares a file system with the application container.

In the present embodiment, each application container is bound to an auxiliary container respectively. A node agent service unit may be deployed in an auxiliary container to complete the task related to the module in the application container, for example, a task of updating the module in the application container. The node agent service unit may be started along with each application container, may be plugged in a namespace of the application container using a Pod auxiliary container in the Kubernetes, shares the file system of the application container, and has an ability to hot update files.

In the present embodiment, a task instruction of the task may be distributed to a plurality of node agent service units simultaneously, and each of the node agent service units executes a command for completing the task simultaneously. For example, a given application is deployed in a plurality of application containers, and accordingly, a module of the application is deployed in the plurality of application containers. In addition, a node agent service unit is deployed in an auxiliary container bound to each of the plurality of application containers. Assuming that a task is a task of updating the module of the application, then an execution instruction of the task may be distributed to a plurality of node agent service units simultaneously. Each of the node agent service units executes the command for completing the task after receiving the instruction of the task.

Step 202: the node agent service unit executes a command for completing the task, in response to acquiring the execution instruction of the task.

In the present embodiment, after the task master control unit provides the execution instruction of the task to the node agent service unit, the node agent service unit may acquire the execution instruction of the task. After acquiring the execution instruction of the task, the node agent service unit may determine the command for completing the task, and execute the command for completing the task to complete the task.

In the present embodiment, files and data may be organized based on a module granularity, and a hot change may be completed using the auxiliary container. Since it is necessary to support hot update of internal data of the container, a task orchestration unit may be defined as a module granularity smaller than a container granularity. The module mainly corresponds to a specified directory within the container. The auxiliary container is permitted to complete the hot change of the directory and files by sharing a data directory of the application container.

In the present embodiment, the auxiliary container may run in the namespace of the application container bound to the auxiliary container, and may complete the task related to the module in the application container by the node agent service unit deployed in the auxiliary container. The node agent service unit may execute the command for completing the task to complete the task. The command may be executed using a stand-alone deployer. The application container itself may open an SSH service monitoring a loopback address. The node agent service unit may transparently transmit the command for completing the task by an SSH. Thus, the task actions between containers are completely concurrent, and are similar to service operations on a physical machine. The execution complexity is reduced from two layers to one layer.

In the present embodiment, the task related to the module in the application container may be completed by the node agent service unit deployed in the auxiliary container, thereby realizing decoupling of resource management and task orchestration management, organizing files and data based on the module granularity in the application container, and completing the hot change using the node agent service unit in the auxiliary container, equivalent to providing a functionality of hot update of the container granularity data update failing to be provided by a cloud native container orchestration engine such as Kubernetes.

In some alternative implementations of the present embodiment, task execution status information may be stored by using a state storing unit of the system for task orchestration. The task execution status information includes: a task execution result, and version information of the module in the application container after executing the task. After executing any task, any node agent service unit may store a corresponding execution result indicating success or failure of the execution, and the version information of the module in the application container after the task execution in the state storing unit.

The state storing unit is equivalent to providing an asynchronous storage service for the task execution result. The asynchronous storage service may be a HTTP service having a directory tree storage structure, and has a characteristic of supporting an eventual consistency between high availability and large-scale concurrency. The state storing unit may be configured to isolate state data of different task types organized by different applications based on a directory tree. The state storing unit has a mechanism of regularly automatically erasing data. The clearing policy is generally a longest audit period, such as 30 days, as promised by the system. The asynchronous storage service may be similar to a Kubernetes object API, and supports an operation interface of a type, such as addition, deletion, finding, modification, or monitoring.

Storing the task execution result, and the version information of the module in the application container after the task execution, by the state storing unit of the system for task orchestration of the state storing unit is equivalent to maintaining the version information of the module in the application container bound to the auxiliary container of the node agent service unit by the node agent service unit, and reducing an inconsistency problem of recording instance information by the task master control unit. Moreover, the node agent service unit itself may store a current version state of modules in the container application and a task record, and may be used for historical fine-grained auditing of the task. An online lock of the module is maintained by an instance based on self-maintained metadata, thereby effectively avoiding a scenario of conflicting deployment of a same module. The same module in the application container may implement a controllable load in a single instance based on a task template id by queue buffer of a finite length. A deployment state and a deployment result are synchronized to the state storing unit based on a node agent service, to ensure the timeliness and persistence of data, whilst reducing the difficulty in stateless design of the task master control unit.

In some alternative implementations of the present embodiment, a situation requiring task compensation, such as state loss, abnormal state, or backward version, may be detected by using a state asynchronous calibration unit of the system for task orchestration, and the task compensation for an instance granularity is performed when detecting the situation requiring task compensation.

Taking a deployment task as an example, an execution instruction of the deployment task is distributed to a plurality of node agent service units, and when a part of the node agent service units does not complete tasks, a proportion of the number of node agent service units failing in task execution among the number of all of the distributed node agent service units of the task may be calculated. When the proportion of the number of node agent service units failing in task execution is less than a proportion threshold, the state asynchronous calibration unit may generate a task compensation instruction of the task, and provide the task compensation instruction to the task master control unit, to trigger the task master control unit to resend the execution instruction of the task to the node agent service units failing in task execution to perform task compensation.

The state asynchronous calibration unit is configured to detect the situation requiring task compensation, such as state loss, abnormal state, or backward version, and perform the task compensation for an instance granularity when detecting the situation requiring task compensation. Thus, in a scenario of large-scale concurrency, e.g., in a scenario where the number of instances reaches a scale of ten thousand level or higher, the system for task orchestration may find a situation of state inconsistency at a second level, to perform task compensation, thus providing a complete fault-tolerant functionality and a high concurrent performance.

In some alternative implementations of the present embodiment, an instruction of a preset type may be sent to a unit associated with the instruction of the preset type by using a message bus unit. The instruction of the preset type includes one of the following items: the execution instruction, a data packet making instruction, or the task compensation instruction.

The message bus unit may be a message middleware, and may send the instruction to a corresponding node agent service unit to guarantee the timeliness of the instruction.

When the task master control unit provides the execution instruction of the task to the node agent service unit, the task master control unit may first send the execution instruction of the task to the message bus unit, and the message bus unit may send the execution instruction of the task to the corresponding node agent service unit after receiving the execution instruction of the task. The node agent service unit may receive the execution instruction of the task, such that the node agent service unit may acquire the execution instruction of the task.

When it is necessary to make a task-related data packet required during execution of the task, such as the deployment task, and a data delivery task, the task master control unit may send the data packet making instruction to the message bus unit. The message bus unit may send the data packet making instruction to a data packet making unit after receiving the data packet making instruction.

The state asynchronous calibration unit may generate the task compensation instruction. When providing the task compensation instruction to the task master control unit, the state asynchronous calibration unit may first send the task compensation instruction to the message bus unit. After receiving the task compensation instruction, the message bus unit may send the task compensation instruction to the task master control unit to trigger the task master control unit to resend the execution instruction of the task to the node agent service units failing in task execution to perform task compensation.

In some alternative implementations of the present embodiment, the task-related data packet is required during execution of the task, such as the deployment task, and the data delivery task, and the data packet making unit may be configured to receive the data packet making instruction sent by the task master control unit; make a task-related data packet meeting a preset criterion; and send the task-related data packet meeting the preset criterion to an object storage system.

Taking a deployment task-related data packet meeting the preset criterion as an example, the data packet making unit may combine output of a continuous integration product library with a deployment meta information directory Metades, to make the deployment task-related data packet meeting the preset criterion. The deployment task-related data packet meeting the preset criterion may be referred to as a deployment package.

The data packet making unit may perform multimodule combination and packing. The data packet making unit may create a temporary directory tmp_foo; decompress a default metades package to the tmp_foo; and execute the following operations successively for a module package on which each generated deployment package is based, until obtaining all deployment packages respectively based on each module package: creating a deployment path with respect to /home/work/, e.g., the deployment path is /home/work/tomcat/webapps, then it is necessary to further create a directory tomcat/webapps under the directory tmp_foo; aligning a decompression module package, and decompressing the module package to the directory tomcat/webapps; moving a metades file, copying tmp_foo/tomcat/webapps/metades/* to tmp_foo/metades, and deleting the directory tmp_foo/tomcat/webapps/metades to obtain the deployment package. The deployment package thus made is stored in object storage in a cloud scenario, thereby avoiding a situation of temporary download address failure of a customized module, and supporting pulling a deployment package of a large-scale concurrency in a whole network at a high throughput relying on the object storage system.

In some alternative implementations of the present embodiment, when the task is a deployment task, the client may initiate the deployment task. The client may send a request for creating a deployment task associated with the module in the application container to the task master control unit. After the task master control unit receives the request for creating the deployment task associated with the module in the application container, the task master control unit may send the data packet making instruction to the data packet making unit. The data packet making unit makes the deployment task-related data packet meeting the preset criterion, e.g., makes a data packet containing data required to update the module in the application container. After the data packet making unit makes the deployment task-related data packet meeting the preset criterion, the data packet making unit sends a packing result indicating completing making the deployment task-related data packet meeting the preset criterion to the master control unit. Meanwhile, the data packet making unit sends the deployment task-related data packet meeting the preset criterion thus made to the object storage system for storage. After the task master control unit receives the packing result indicating completing making the deployment task-related data packet meeting the preset criterion, the task master control unit determines that the module in the application container for the deployment task, i.e., a module related to the task, is not in the deployment state, and sends the execution instruction of the deployment task to the node agent service unit deployed in the auxiliary container bound to the application container of the module related to the task. The execution instruction of the deployment task is provided to the node agent service unit in the auxiliary application container, for example, sent to the node agent service unit by the message bus unit, and the node agent service unit receives the execution instruction of the deployment task. After acquiring the execution instruction of the deployment task, the node agent service unit may check validity of the module and version. When both the module and the version are valid, the node agent service unit may pull the deployment package from the object storage system. The node agent service unit may decompress the deployment package. The node agent service unit executes a command for completing the deployment task using the deployment package to complete the deployment task. The node agent service unit may execute a callback command after completing the deployment task. When the deployment task is successfully executed, the version information of the module related to the deployment task is updated. The node agent service unit may synchronize an execution result of the deployment task and latest version information of the module related to the deployment task after executing the deployment task to the state storing unit, i.e., send the execution result of the deployment task and the latest version information of the module related to the deployment task after executing the deployment task to the state storing unit, to store the execution result of the deployment task and the latest version information of the module related to the deployment task after executing the deployment task in the state storing unit.

Figure 3:
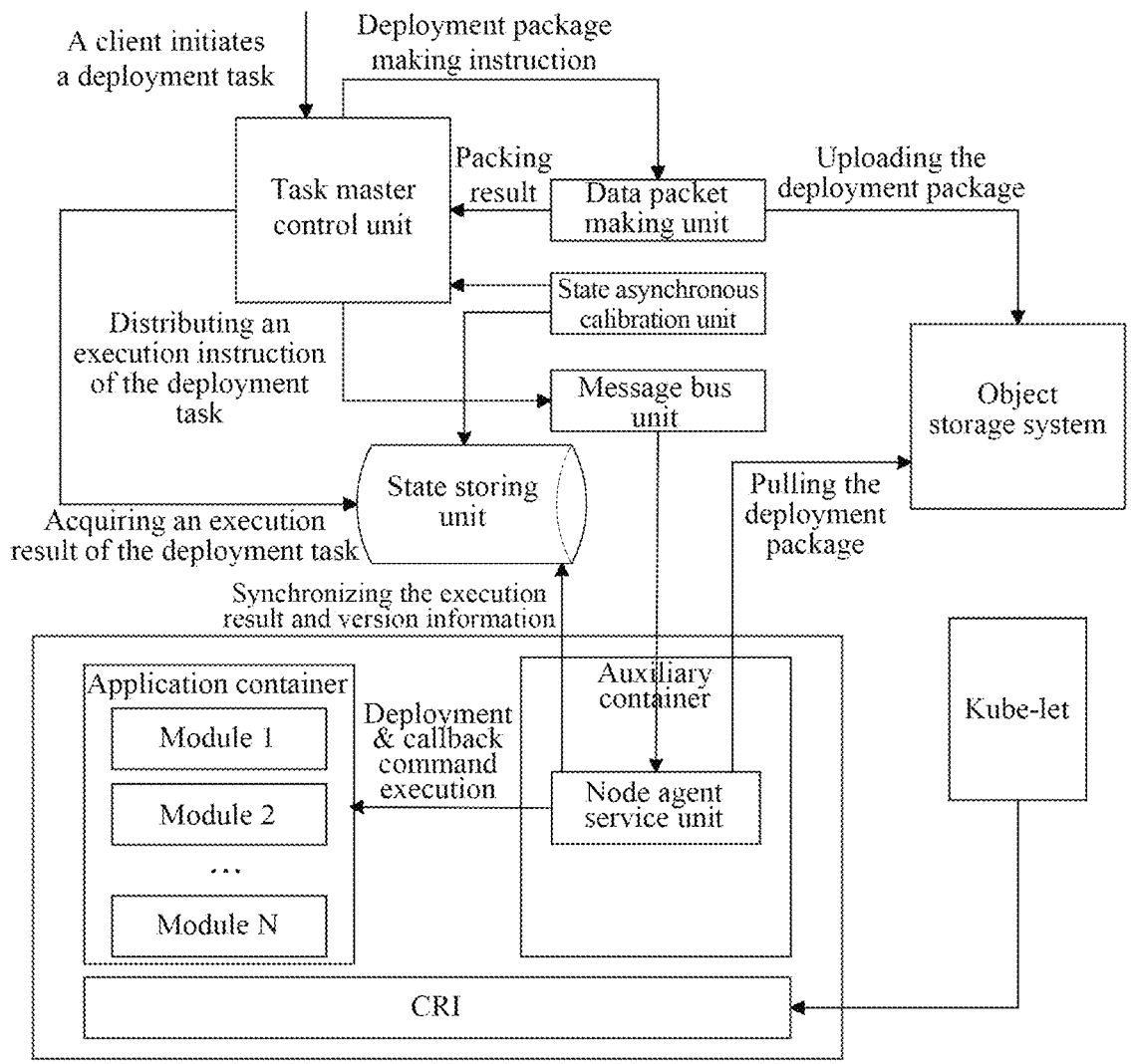
FIG. 3 shows an exemplary flowchart of executing a deployment task.

Referring to FIG. 3, an exemplary flowchart of executing a deployment task is shown.

In some alternative implementations of the present embodiment, when the task is a timed task, a client may initiate the timed task. The client may send a request for creating a timed task to a task master control unit. After receiving the request for creating the timed task, the task master control unit may create the timed task. An execution process of a single timed task may be equivalent to an execution process of a deployment task without a deployment package. The timed task may be triggered once at interval of a preset duration. Timekeeping may be started using an internal timer of a program. The execution process of the timed task is triggered once each time when reaching a moment of triggering the timed task, i.e., at intervals of the preset duration.

The task master control unit sends an execution instruction of the timed task to a node agent service unit deployed in an auxiliary container bound to an application container of a module related to the timed task at intervals of the preset duration. The task master control unit sends the execution instruction of the timed task to the node agent service unit at intervals of the preset duration. After the node agent service unit acquires the execution instruction of the timed task each time, the node agent service unit may immediately initiate a SSH session to the application container in response to acquiring the execution instruction of the timed task, and execute the command for completing the task to complete the task. The node agent service unit may execute a fault-tolerant logic, such as timeout give-up, or retry after failure. The node agent service unit may synchronize an execution result of the timed task and latest version information of a module related to the timed task after executing the timed task to a state storing unit, i.e., send the execution result of the timed task and the latest version information of the module related to the timed task after executing the timed task to the state storing unit, to store the execution result of the timed task and the latest version information of the module related to the timed task after executing the timed task in the state storing unit.

Figure 4:
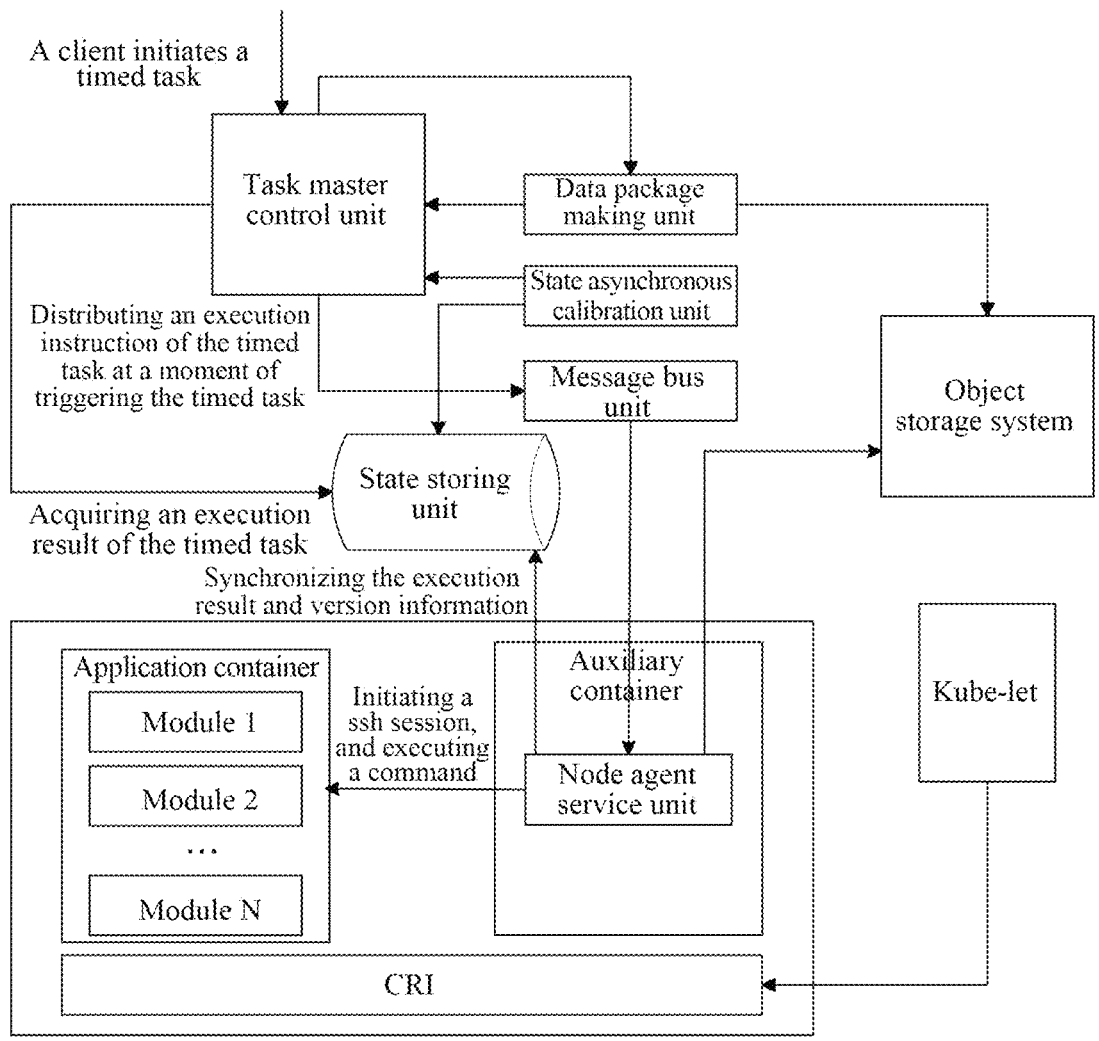
FIG. 4 shows an exemplary flowchart of executing a timed task.

Referring to FIG. 4, an exemplary flowchart of executing a timed task is shown.

In some alternative implementations of the present embodiment, when the task is a data delivery task, a client may initiate the data delivery task. The client may create a request for creating the data delivery task associated with a module in an application container to a task master control unit. The request includes a download address for generating a data source of a delivery data packet. After the task master control unit receives the request for creating the data delivery task associated with the module in the application container, the task master control unit may send the delivery data packet making instruction to the data packet making unit. After receiving the delivery data packet making instruction, the data packet making unit may pull the data source based on the download address of the data source, decompress the data source to check its validity, make a delivery data packet meeting a preset criterion, which may also be referred to a standard delivery data packet, when determining the data source being valid, and send the delivery data packet to an object storage system for storage.

The data packet making unit sends a packing result indicating completing making the delivery data packet meeting the preset criterion. After receiving the packing result indicating completing making the delivery data packet meeting the preset criterion sent by the data packet making unit, the task master control unit sends an execution instruction of the data delivery task to a node agent service unit deployed in an auxiliary container bound to an application container of a module related to the data delivery task. The node agent service unit pulls the delivery data packet meeting the preset criterion from the object storage system, in response to acquiring the execution instruction of the data delivery task. The node agent service unit may decompress the delivery data packet, and deliver decompressed data to a target directory in the application container, to obtain an execution result of the data delivery task; and synchronize the execution result of the data delivery task to the state storing unit.

Figure 5:
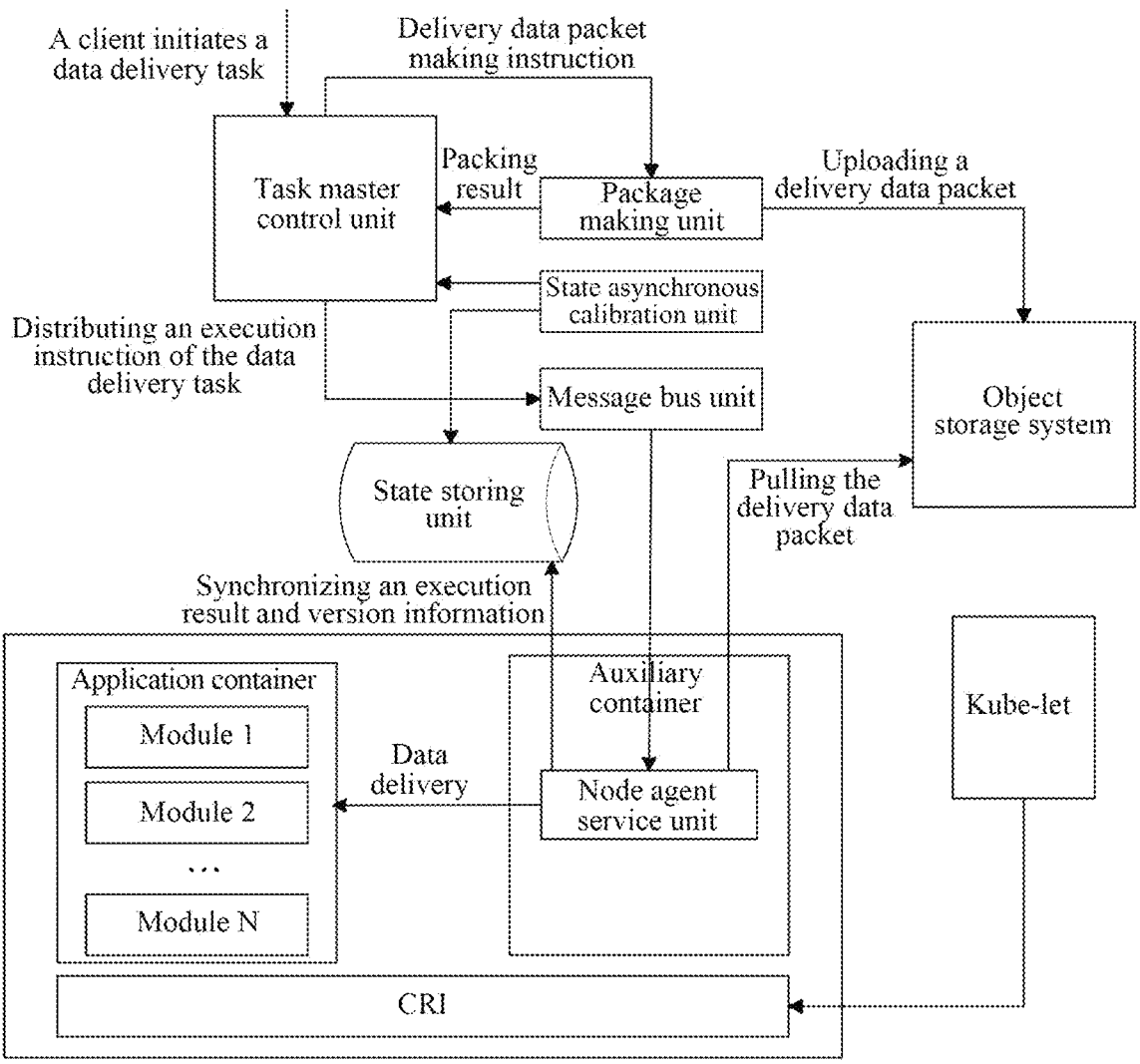
FIG. 5 shows a schematic flowchart of executing a data delivery task.

Referring to FIG. 5, a schematic flowchart of executing a data delivery task is shown.

In the present embodiment, a stored data structure related to a task of each type may be divided into a metadata structure and a state data structure. The state data structure is a data structure for storing task execution status information, such as a task execution result, and version information of a module. Differential extension of data related to a task of each type is only carried out in the metadata structure, thus unifying scheduling of tasks of a plurality of types, such as a deployment task, a timed task, a data delivery task, and a one-off command task. On the scheduling standard, the tasks of the plurality of types may be scheduled based on an instance granularity.

In the present embodiment, in view of a possibly arising situation of a collision between a created new instance, i.e., a new application container, and task execution during application expansion, if a task cannot be normally executed because an instance is not ready, a state asynchronous calibration unit may be configured to initiate task compensation for the created new instance. The state asynchronous calibration unit may detect whether initialization of the created new instance is completed. After detecting completing initialization of the created new instance, the state asynchronous calibration unit may initiate one-off task compensation for the created new instance.

Figure 6:
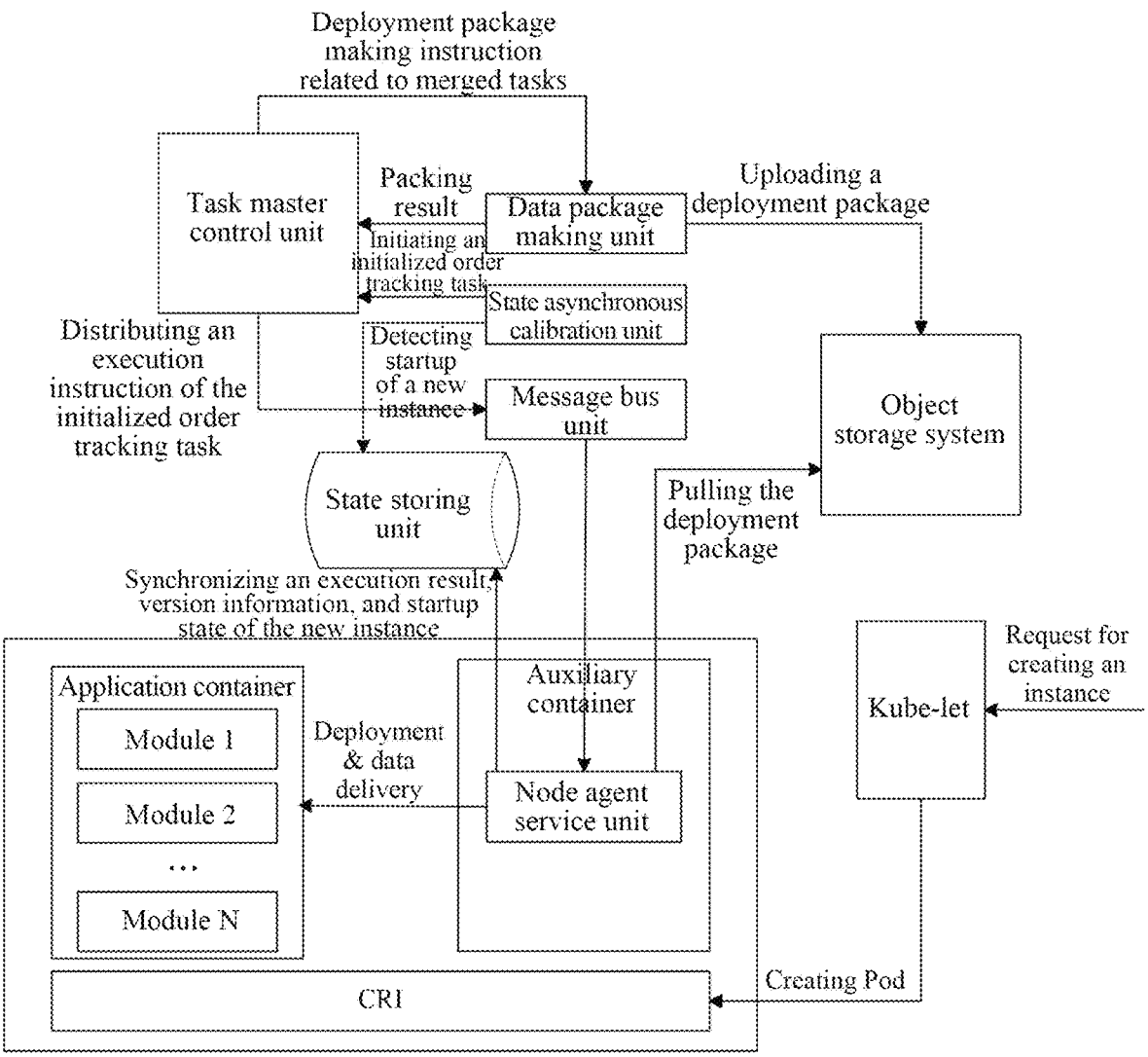
FIG. 6 shows a schematic flowchart of executing an initialized order tracking task.

Referring to FIG. 6, a schematic flowchart of executing an initialized order tracking task is shown.

The initialized order tracking task may be initiated by a state asynchronous calibration unit. The state asynchronous calibration unit may send a task compensation instruction of an unexecuted task associated with a module in the created new instance to a task master control unit. The task master control unit may merge unexecuted tasks associated with the module in the created new instance. The task master control unit sends a request for making a deployment package required to complete each task of the merged tasks to a data packet making unit. The data packet making unit makes the deployment package required to complete each task, and stores the made deployment package in an object storage system. The task master control unit sends an execution instruction of the initialized order tracking task to a node agent service unit associated with the created new instance. The node agent service unit acquires the deployment package from the object storage system. The node agent service unit completes the unexecuted tasks associated with the module in the created new instance.

Figure 7:
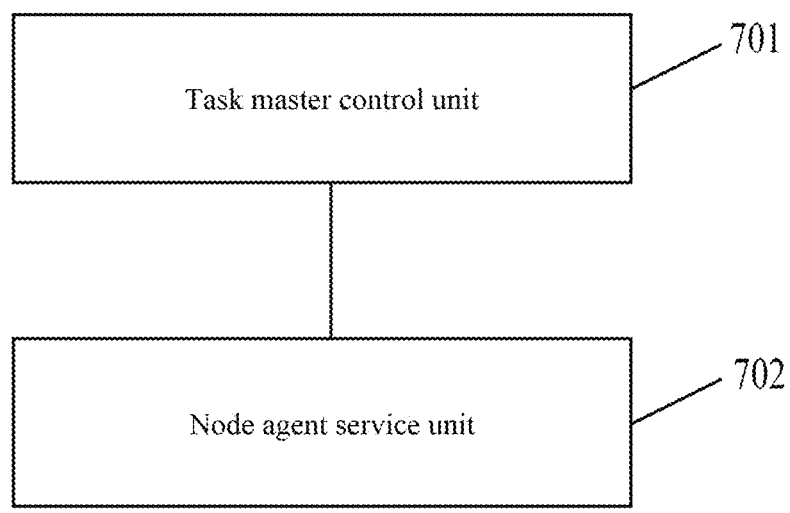
FIG. 7 shows a schematic structural diagram of a system for task orchestration according to an embodiment of the present disclosure.

Further referring to FIG. 7, as an implementation of the method shown in the above figures, an embodiment of the present disclosure provides a system for task orchestration. The embodiment of the system corresponds to the embodiment of the method shown in FIG. 2.

As shown in FIG. 7, the system for task orchestration of the present embodiment includes: a task master control unit 701, and a node agent service unit 702. The task master control unit 701 is configured to: provide an execution instruction of a task related to a module in an application container to the node agent service unit in an auxiliary application container bound to the application container, the auxiliary application container sharing a file system with the application container; and the node agent service unit 702 is configured to: execute a command for completing the task, in response to acquiring the execution instruction of the task.

In some alternative implementations of the present embodiment, the system for task orchestration further includes: a state storing unit configured to: store task execution status information. The task execution status information includes: a task execution result, and version information of the module in the application container after executing the task.

In some alternative implementations of the present embodiment, the system for task orchestration further includes: a state asynchronous calibration unit configured to: acquire the task execution status information of the task from the state storing unit; detect whether there is a situation requiring task compensation based on the acquired task execution status information; and send a task compensation instruction of the task to the task master control unit, in response to detecting there being the situation requiring task compensation.

In some alternative implementations of the present embodiment, the system for task orchestration further includes: a message bus unit configured to: send an instruction of a preset type to a unit associated with the instruction of the preset type. The instruction of the preset type includes one of the following items: the execution instruction, a data packet making instruction, or the task compensation instruction.

In some alternative implementations of the present embodiment, the system for task orchestration further includes: a data packet making unit configured to: receive the data packet making instruction sent by the task master control unit; make a task-related data packet meeting a preset criterion; and send the task-related data packet meeting the preset criterion to an object storage system.

In some alternative implementations of the present embodiment, the task is a deployment task; and the task master control unit is further configured to: send a deployment data packet making instruction to a data packet making unit; receive a packing result indicating completing making a deployment task-related data packet meeting the preset criterion sent by the data packet making unit, wherein the deployment task-related data packet meeting the preset criterion is stored in the object storage system; and provide an execution instruction of the deployment task to the node agent service unit; and the node agent service unit is further configured to: pull the deployment task-related data packet meeting the preset criterion from the object storage system, in response to acquiring the execution instruction of the deployment task; execute a command for completing the deployment task, to obtain an execution result of the deployment task; and synchronize the execution result of the deployment task and the version information of the module to the state storing unit.

In some alternative implementations of the present embodiment, the task is a timed task; and the task master control unit is further configured to: send an execution instruction of the timed task to the node agent service unit at intervals of a preset duration, wherein the node agent service unit, in response to acquiring the execution instruction of the timed task, executes a command for completing the timed task, to obtain an execution result of the timed task, and synchronizes the execution result of the timed task and the version information of the module to the state storing unit.

In some alternative implementations of the present embodiment, the task is a data delivery task; and the task master control unit is configured to: send a delivery data packet making instruction to the data packet making unit; receive a packing result indicating completing making a delivery data packet meeting the preset criterion sent by the data packet making unit, where the delivery data packet meeting the preset criterion is stored in the object storage system; and send an execution instruction of the data delivery task to the node agent service unit; and the node agent service unit is configured to: pull the delivery data packet meeting the preset criterion from the object storage system, in response to acquiring the execution instruction of the data delivery task; decompress the delivery data packet, and deliver decompressed data to a target directory in the application container, to obtain an execution result of the data delivery task; and synchronize the execution result of the data delivery task to the state storing unit.

Embodiments of the present disclosure further provide a computer readable medium. The computer readable medium stores one or more programs. The one or more programs, when executed by an electronic device, cause the electronic device to execute operations described in the above embodiments.

It should be noted that the computer readable medium according to the embodiments of the present disclosure may be a computer readable signal medium or a computer readable storage medium or any combination of the above two. An example of the computer readable storage medium may include, but is not limited to: electric, magnetic, optical, electromagnetic, infrared, or semiconductor systems, methods, elements, or a combination of any of the above. A more specific example of the computer readable storage medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In the embodiments of the present disclosure, the computer readable storage medium may be any tangible medium containing or storing programs, which may be used by, or used in combination with, a message execution system, method or element. In the embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable medium is capable of transmitting, propagating or transferring programs for use by, or used in combination with, a message execution system, method or element. The program codes contained on the computer readable medium may be transmitted with any suitable medium, including but not limited to: wireless, wired, optical cable, RF medium, etc., or any suitable combination of the above.

The flow charts and block diagrams in the accompanying drawings illustrate architectures, functionalities and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable messages for implementing specified logical functionalities. It should be further noted that, in some alternative implementations, the functionalities denoted by the blocks may occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer messages.

The above description only provides explanation of the preferred embodiments of the present disclosure and the employed technical principles. It should be appreciated by those skilled in the art that the inventive scope of the present disclosure is not limited to the technical solutions formed by the particular combinations of the above-described technical features. The inventive scope should also cover other technical solutions formed by any combination of the above-described technical features or equivalent features thereof without departing from the concept of the disclosure, for example, technical solutions formed by the above-described features being interchanged with, but not limited to, technical features with similar functions disclosed in the present disclosure.

What is claimed is:

1. A method for task orchestration, comprising:
providing, by a task master control unit, an execution instruction of a task related to a module in an application container to a node agent service unit in an auxiliary application container bound to the application container, the auxiliary application container sharing a file system with the application container, wherein a granularity of the module is smaller than that of the application container;
executing, by the node agent service unit, a command for completing the task, in response to acquiring the execution instruction of the task;
receiving a data packet making instruction sent by the task master control unit using a data packet making unit;
making a task-related data packet meeting a preset criterion; and
sending the task-related data packet meeting the preset criterion to an object storage system.

2. The method according to claim 1, wherein the method further comprises:
storing task execution status information using a state storing unit, the task execution status information comprising: a task execution result, and version information of the module in the application container after executing the task.

3. The method according to claim 2, wherein the method further comprises:
acquiring the task execution status information of the task from the state storing unit using a state asynchronous calibration unit;
detecting whether there is a situation requiring task compensation based on the acquired task execution status information; and
sending a task compensation instruction of the task to the task master control unit, in response to detecting there being the situation requiring task compensation.

4. The method according to claim 3, wherein the method further comprises:
sending an instruction of a preset type to a unit associated with the instruction of the preset type using a message bus unit, the instruction of the preset type comprising one of following items: an execution instruction, the data packet making instruction, or the task compensation instruction.

5. The method according to claim 4, wherein the task is a deployment task; and the method further comprises:
sending, by the task master control unit, a deployment data packet making instruction to the data packet making unit; receiving, by the task master control unit, a packing result indicating completing making a deployment task-related data packet meeting the preset criterion sent by the data packet making unit, wherein the deployment task-related data packet meeting the preset criterion is stored in the object storage system; and providing, by the task master control unit, an execution instruction of the deployment task to the node agent service unit; and
pulling, by the node agent service unit, the deployment task-related data packet meeting the preset criterion from the object storage system, in response to acquiring the execution instruction of the deployment task; executing, by the node agent service unit, a command for completing the deployment task, to obtain an execution result of the deployment task; and synchronizing the execution result of the deployment task and the version information of the module to the state storing unit.

6. The method according to claim 4, wherein the task is a timed task; and the method further comprises:
sending, by the task master control unit, an execution instruction of the timed task to the node agent service unit at intervals of a preset duration, wherein the node agent service unit, in response to acquiring the execution instruction of the timed task, executes a command for completing the timed task, to obtain an execution result of the timed task, and synchronizes the execution result of the timed task and the version information of the module to the state storing unit.

7. The method according to claim 4, wherein the task is a data delivery task; and the method further comprises:
sending, by the task master control unit, a delivery data packet making instruction to the data packet making unit;
receiving, by the task master control unit, a packing result indicating completing making a delivery data packet meeting the preset criterion sent by the data packet making unit, wherein the delivery data packet meeting the preset criterion is stored in the object storage system; and sending, by the task master control unit, an execution instruction of the data delivery task to the node agent service unit; and
pulling, by the node agent service unit, the delivery data packet meeting the preset criterion from the object storage system, in response to acquiring the execution instruction of the data delivery task; decompressing, by the node agent service unit, the delivery data packet, and delivering, by the node agent service unit, decompressed data to a target directory in the application container, to obtain an execution result of the data delivery task; and synchronizing, by the node agent service unit, the execution result of the data delivery task to the state storing unit.

8. A non-transitory computer readable medium, storing a computer program thereon, wherein the computer program, when executed by a processor, implements the method according to claim 1.

9. A system for task orchestration, comprising:
at least one processor; and
a memory that is communicated with at least one processor wherein, the memory stores instructions executable by the at least one processor to:
provide an execution instruction of a task related to a module in an application container to a node agent service unit in an auxiliary application container bound to the application container, the auxiliary application container sharing a file system with the application container, wherein a granularity of the module is smaller than that of the application container;
execute a command for completing the task, in response to acquiring the execution instruction of the task;
receive a data packet making instruction sent by a task master control unit using a data packet making unit;
make a task-related data packet meeting a preset criterion; and
send the task-related data packet meeting the preset criterion to an object storage system.

10. The system according to claim 9, wherein the processor is further configured to execute the instructions to:
store task execution status information, the task execution status information comprising:
a task execution result, and
version information of the module in the application container after executing the task.

11. The system according to claim 10, wherein the processor is further configured to execute the instructions to:
acquire the task execution status information of the task from a state storing unit;
detect whether there is a situation requiring task compensation based on the acquired task execution status information; and
send a task compensation instruction of the task to the task master control unit, in response to detecting there being the situation requiring task compensation.

12. The system according to claim 11, wherein the processor is further configured to execute the instructions to:
send an instruction of a preset type to a unit associated with the instruction of the preset type, the instruction of the preset type comprising one of following items: an execution instruction, the data packet making instruction, or the task compensation instruction.

13. The system according to claim 12, wherein the task is a deployment task; and the processor is further configured to execute the instructions to:
send a deployment data packet making instruction to the data packet making unit;
receive a packing result indicating completing making a deployment task-related data packet meeting the preset criterion sent by the data packet making unit, wherein the deployment task-related data packet meeting the preset criterion is stored in the object storage system; and
provide an execution instruction of the deployment task to the node agent service unit; and
have the node agent service unit-pull the deployment task-related data packet meeting the preset criterion from the object storage system, in response to acquiring the execution instruction of the deployment task;
execute a command for completing the deployment task, to obtain an execution result of the deployment task; and
synchronize the execution result of the deployment task and the version information of the module to the state storing unit.

14. The system according to claim 12, wherein the task is a timed task; and the processor is further configured to execute the instructions to: send an execution instruction of the timed task to the node agent service unit at intervals of a preset duration,
    wherein the node agent service unit is configured to:
        in response to acquiring the execution instruction of the timed task, execute a command for completing the timed task, to obtain an execution result of the timed task, and
        synchronize the execution result of the timed task and the version information of the module to the state storing unit.

15. The system according to claim 12, wherein the task is a data delivery task; and the processor is further configured to execute the instructions to:
    send a delivery data packet making instruction to a data packet making unit;
    receive a packing result indicating completing making a delivery data packet meeting the preset criterion sent by the data packet making unit, wherein the delivery data packet meeting the preset criterion is stored in the object storage system; and
    send an execution instruction of the data delivery task to the node agent service unit; and
    have the node agent service unit pull the delivery data packet meeting the preset criterion from the object storage system, in response to acquiring the execution instruction of the data delivery task;
    deliver the delivery data packet to a target directory in the application container, to obtain an execution result of the data delivery task; and
    synchronize the execution result of the data delivery task to the state storing unit.

\* \* \* \* \*